United States Patent [19]

Geibel et al.

[11] Patent Number: 5,318,606
[45] Date of Patent: Jun. 7, 1994

[54] FILTRATION SYSTEM

[75] Inventors: Stephen A. Geibel, Cortland; Mark F. Hurwitz, Ithaca, both of N.Y.

[73] Assignee: Pall Corporation, East Hills, N.Y.

[21] Appl. No.: 333,039

[22] Filed: Apr. 4, 1989

[51] Int. Cl.⁵ .......................................... B01D 46/24
[52] U.S. Cl. .......................................... 55/269; 55/309; 55/484; 55/498; 55/521; 55/523; 55/525
[58] Field of Search .................. 55/80, 97, 208, 267, 55/269, 473, 482, 521, 525, 498, DIG. 9, 350, 309, 523, 420, 484, 341.2; 165/119, 122; 376/309, 312-314

[56] References Cited

U.S. PATENT DOCUMENTS

| | | | |
|---|---|---|---|
| Re. 31,966 | 8/1985 | Sillers, Jr. | 210/238 |
| 485,526 | 11/1892 | Best . | |
| 1,815,570 | 7/1931 | Jones . | |
| 2,106,838 | 2/1938 | Gates | 55/418 |
| 2,792,074 | 5/1957 | Schilb et al. | 55/97 |
| 3,075,448 | 1/1963 | Cohen | 55/DIG. 9X |
| 3,212,237 | 10/1965 | Wright | 55/267 |
| 3,236,053 | 2/1966 | Billue | 61/0.5 |
| 3,273,323 | 6/1966 | Whitfield | 55/385 |
| 3,353,335 | 11/1967 | Caballero | 55/94 |
| 3,435,593 | 4/1969 | Nordone | 55/84 |
| 3,477,203 | 11/1969 | Luge et al. | 55/9 |
| 3,533,466 | 10/1970 | Salamon et al. | 165/122 |
| 3,548,931 | 12/1970 | Gellner et al. | 376/314 X |
| 3,796,024 | 3/1974 | Mier | 55/267 |
| 3,977,847 | 8/1976 | Clark | 55/525 |
| 4,023,944 | 5/1977 | Beane | 55/481 |
| 4,062,664 | 12/1977 | Dupre et al. | 55/379 |
| 4,169,059 | 9/1979 | Storms | 210/493 R |
| 4,209,310 | 6/1980 | Berkhoel | 55/521 |
| 4,356,005 | 10/1982 | Schumann | 55/17 |
| 4,459,140 | 7/1984 | Kuban et al. | 55/356 |
| 4,497,642 | 2/1985 | Hackney | 55/422 |
| 4,687,579 | 8/1987 | Bergman | 53/523 |
| 4,698,202 | 10/1987 | Wachholz et al. | 376/300 |

FOREIGN PATENT DOCUMENTS

| | | |
|---|---|---|
| 0290028 | 5/1988 | European Pat. Off. . |
| 3212265 | 2/1982 | Fed. Rep. of Germany . |
| 2132504 | 7/1964 | United Kingdom . |
| 1223909 | 3/1971 | United Kingdom . |
| 1451073 | 9/1976 | United Kingdom . |
| 2028163 | 8/1979 | United Kingdom . |
| 2212321 | 7/1989 | United Kingdom . |

*Primary Examiner*—Charles Hart
*Attorney, Agent, or Firm*—Leydig, Voit & Mayer

[57] ABSTRACT

A filtration system and method. The filtration system comprises a manifold having an inlet, a plurality of filter elements mounted to the manifold, and a scheme for convectively cooling the filter elements to limit the temperature of the filter elements to a predetermined temperature. The filtration method comprises the steps of passing a fluid through a plurality of filter elements and convectively cooling the filter elements to limit the temperature of the filter elements to a predetermined temperature.

4 Claims, 1 Drawing Sheet

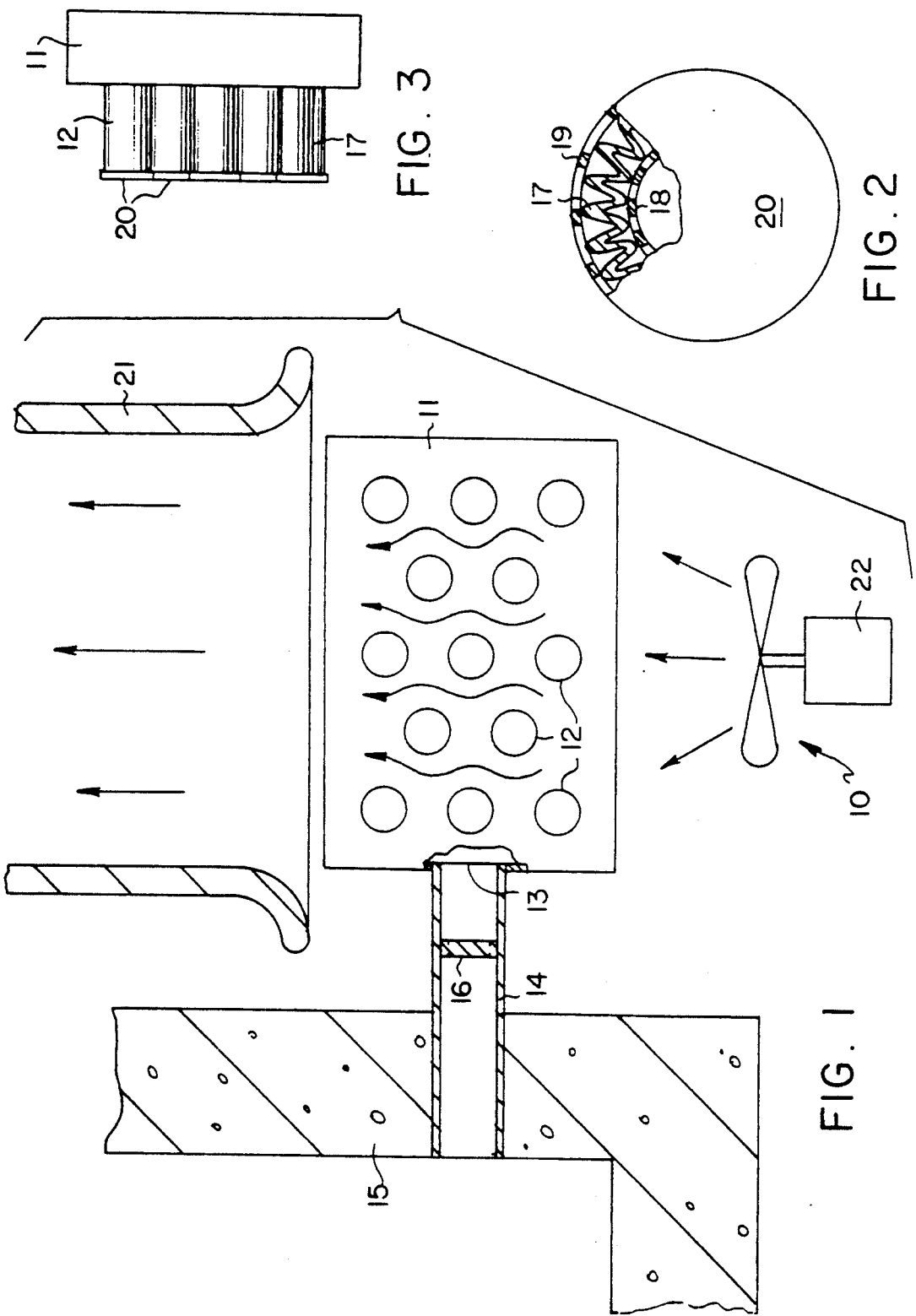

FILTRATION SYSTEM

TECHNICAL FIELD

The present invention relates to the filtering of fluids and, more particularly, to the filtering of fluids by a filter element and the removal of heat from the filter element.

BACKGROUND OF THE INVENTION

In a nuclear power plant, the nuclear reactor and most of the components associated with the reactor are typically enclosed within a containment building. The containment building may be constructed of reinforced concrete, having walls several feet thick. The containment building serves to trap radioactive debris and protect the outside environment in the event of an accident.

Unfortunately, if the accident results in the generation of sufficiently high pressures, the containment building may rupture. Radioactive debris will then be scattered over a wide area and any radioactive components remaining in the ruptured containment building may be exposed to the outside environment.

SUMMARY OF THE INVENTION

The present invention provides a vent system for a containment building, the filtration system comprising a manifold, a vent, and several filter elements. The vent communicates between the containment building and the manifold and includes a vent member, such as a rupturable disc, that opens the vent when the pressure inside the containment building exceeds a predetermined value. The filter elements are mounted to the manifold spaced from one another, and the filtration system further comprises a scheme for convectively cooling the filter elements to limit the temperature of the filter elements to a predetermined temperature.

During normal operating conditions and during abnormal incidents when the pressure within the containment building does not exceed a predetermined value, the vent member keeps the vent closed, isolating the inside of the containment building from the outside. However, if an accident is sufficiently severe to raise the pressure inside the containment building above the predetermined value, the vent member will open the vent. The high pressure gas then escapes the containment building by passing through the vent, into the manifold, and through the filter cartridges. Releasing the gas reduces the pressure inside the containment building, thereby reducing the risk that the containment building will rupture.

By passing the gas through the filter cartridges, any radioactive particulate matter borne by the gas is trapped in the filter cartridges and prevented from contaminating the environment. As the radioactive chemical elements in the trapped particulate matter decay, they generate heat which raises the temperature of the filter elements. To prevent particulate matter from melting or vaporizing and thus passing through the filter elements and to prevent the filter elements from melting, the cooling scheme convectively cools the filter elements by creating a flow of a fluid such as air across the filter elements. Thus, the temperature of the filter elements may be maintained below a predetermined temperature, such as the melting point of the filter elements or the melting point or vaporization point of the radioactive debris trapped in the filter elements. In accordance with the invention, the cooling scheme comprising an arrangement of the filter elements which spaces the filter elements from one another a distance sufficient to limit the temperature of the filter elements to the predetermined temperature by natural convection. Alternative cooling schemes which may be used together with the arrangement of the filter elements include a structure such as a cooling tower which creates a draft by natural convection or an apparatus such as a blower or fan which creates a flow of air to cool the filter elements by forced convection.

BRIEF DESCRIPTION OF THE DRAWINGS

In the accompanying drawings:

FIG. 1 is a schematic diagram of a filtration system and a vent system embodying the present invention;

FIG. 2 is a cross-sectional view of a filter element of FIG. 1; and

FIG. 3 is a side view of the manifold and filter elements of FIG. 1.

DESCRIPTION OF EMBODIMENTS

As shown in FIG. 1, an exemplary filtration system 10 embodying the invention generally comprises a manifold 11, several filter elements 12, and a scheme for convectively cooling the filter elements 12. The manifold 11, which has an inlet 13 for admitting fluid into the manifold 11, serves to distribute the fluid among the filter elements 12. Particulate matter, which includes solid particles as well as liquid droplets if the fluid is a gas, is removed from the fluid as it flows through the filter elements 12. The cooling scheme serves to convectively cool the filter elements 12 by creating a flow of a cooling fluid such as air along the filter elements 12.

A filtration system 10 embodying the invention has many applications. For example, it may be used as a filter in chemical processes where the components continue to react as they are being filtered, thereby generating heat in the filter elements. An example of such a chemical process is the collection of burning or oxidizing charcoal ash. However, the filtration system 10 is particularly useful in a vent system for a containment building of a nuclear power plant. As shown in FIG. 1, the vent system includes, in addition to the manifold 11, filter elements 12, and cooling scheme, a vent 14 which communicates between the inside of the containment building 15 and the manifold 11. A vent member 16, such as a rupturable disc or a spring-actuated valve assembly, blocks the vent 14 if the pressure inside the containment building 15 is below a predetermined value and opens the vent 14 if the pressure inside the containment building 15 exceeds the predetermined value.

During normal operating conditions or during abnormal incidents when the pressure within the containment building 15 remains below the predetermined value, the vent member 16 keeps the vent 14 closed, isolating the inside of the containment building 15 from the outside. In the event of an accident severe enough to raise the pressure inside the containment building 15 above the predetermined value, the vent member 16 opens the vent 14. The high pressure gas then escapes the containment building 15 by passing through the vent 14, into the manifold 11, and through the filter cartridges 12. Releasing the gas reduces the pressure inside the containment building 15, thereby reducing the risk that the containment building 15 will rupture.

By passing the gas through the filter cartridges 12, any radioactive particulate matter borne by the gas is trapped in the filter cartridges 12. By trapping the radioactive debris in the filter elements 12, the environment remains free of radioactive particulate matter. Further, clean-up is facilitated because the detachably mounted filter elements which contain the radioactive debris may be relatively easily and safely removed and stored. However, as the radioactive chemical elements in the trapped particulate matter decay, they generate heat which is capable of damaging the filter elements 12 or melting or vaporizing the particulate matter.

To effectively filter the gas and limit the temperature while heat is being generated by the trapped radioactive debris, the filter elements 12 may be variously configured. Preferably, each filter element 12 preferably has a generally hollow, cylindrical, pleated configuration and comprises a porous metal filter medium 17, as shown in FIG. 2. Although other configurations, such as a flat pack or disc, may be suitable, the hollow, cylindrical, pleated configuration is preferable because it has a larger filtration surface area. Although other filter media, such as a polymeric filter media, may be suitable if the temperature can be maintained at a low enough level, the metal filter medium is preferable because it can withstand higher temperatures without damage. Further, because the metal filter media has a higher thermal conductivity, it more effectively radiates heat than other filter media. One example of a suitable porous metal filter medium is a fiber metal medium formed from sintered stainless steel. The filter element 12 may further include a core 18 disposed around the inside of the pleated filter medium 17 to provide additional structural support. A cage 19 may be disposed around the outside of the pleated filter medium 17 to protect the medium and to support the medium 17 against the force of any outwardly flowing gas. To minimize interference with the convective cooling of the filter medium 17, the cage 19 is preferably very open and may have, for example, a 70% open area.

The filter elements 12 are preferably detachably mounted to the manifold 11. The filter elements may be mounted inside the manifold with the gas flowing outside-in through the filter elements. However, to more effectively allow convective cooling of the filter elements 12, the filter elements 12 preferably extend outside of the manifold 11, as shown in FIG. 3, with the end of the pleated filter medium 17 being capped by an impermeable end cap 20. The gas thus flows inside-out through the filter elements 12. The filter elements are preferably oriented so that their axes are horizontal. Rather than cantilever the filter elements 12 from the manifold 11, the end caps 20 of the filter elements 12 may be attached to a support structure (not shown). Further, the exterior surfaces of the filter elements are preferably exposed to the atmosphere in order to most effectively cool the filter elements 12. The filter elements 12 may be contained within an enclosure (not shown), for example, if it is desirable to maintain the filter elements 12 in an inert atmosphere when the vent system is not in operation. However, when the vent system is in operation, it is most preferable that the support structure or enclosure do not provide any significant resistance to air flow over the filter elements 12. Consequently, the enclosure may comprise a rupturable shroud.

To further protect the filter elements 12 and prevent melting or vaporization of the particulate matter from the heat generated by the trapped radioactive debris, the filter elements 12 are convectively cooled, in accordance with the invention. Although convective cooling may be effected in any suitable manner, the preferred cooling scheme comprises an arrangement of the filter elements which spaces the filter elements from one another a distance sufficient to limit the temperature of the filter elements 12 to a predetermined temperature by natural convection. The arrangement may preferably be a regular array, such as that shown in FIGS. 1 and 2. The spacing between filter elements may be calculated according to conventional heat transfer methods by determining a maximum desirable temperature for the filter element and assuming a worst-case heat load for the filter elements 12.

For example, a total heat load of 50 Kw may be assumed and a maximum desirable temperature of 300° C. may be selected. For a filter element formed from sintered stainless steel fiber metal and having a 2¼ inch outside diameter with forty ½ inch deep pleats around the circumference, it is expected that approximately 280 linear feet of the filter element would be required. If each element were 6 feet long, then a regular array of about 47 filter elements with centerlines spaced approximately 4½ inch from each other may be provided.

As an alternative to or in addition to the arrangement of the filter elements 12, the cooling scheme may include a structure 21 such as a draft tower which creates a draft of air. The filter elements 12 may then be positioned in the draft to convectively cool them. The cooling scheme may also include an apparatus 22, such as a blower or fan, for creating a flow of air. The filter elements 12 may then be positioned in the air flow to cool them by forced convection. The arrangement of filter elements is preferable, however, because, in the event of an accident, electrical energy may not be available to power the blower.

Although the present invention has been described in terms of a particular embodiment, it is not limited to that embodiment. Alternative embodiments and modifications which would still be encompassed by the invention may be made by those skilled in the art, particularly in light of the foregoing teachings. Therefore, the following claims are intended to cover any alternative embodiments, modifications, or equivalents which may be included within the spirit and scope of the invention as defined by the claims.

We claim:

1. A filtration system for a containment building and adapted to remove particulates which include sources of heat, the filtration system comprising a manifold, a vent communicating between the containment building and the manifold and including a member that opens the vent when the pressure inside the containment building exceeds a predetermined value, and a plurality of filter elements mounted to the manifold, each filter element communicating with the manifold and the plurality of filter elements being mounted to the manifold in an arrangement which spaces the filter elements from one another a distance sufficient to limit the temperature of each filter element to a predetermined temperature by natural convection.

2. The filtration system of claim 1 wherein the member comprises a rupturable disc.

3. The filtration system of claim 1 wherein each filter element has a generally hollow, cylindrical configuration and comprises a pleated, porous metal filter medium.

4. The filtration system of claim 3 wherein the filter elements are mounted to the manifold to filter a gas flowing inside-out through the filter elements thereby defining an upstream surface inside the filter element and a downstream surface outside the filter element and wherein a flow of gas is directed along the downstream surfaces of the filter elements.

* * * * *